(12) United States Patent
Lu et al.

(10) Patent No.: US 7,392,534 B2
(45) Date of Patent: Jun. 24, 2008

(54) SYSTEM AND METHOD FOR PREVENTING IDENTITY THEFT USING A SECURE COMPUTING DEVICE

(75) Inventors: HongQian Karen Lu, Austin, TX (US); Asad Mahboob Ali, Austin, TX (US)

(73) Assignee: Gemalto, Inc

( * ) Notice: Subject to any disclaimer, the term of this patent is extended or adjusted under 35 U.S.C. 154(b) by 850 days.

(21) Appl. No.: 10/750,430

(22) Filed: Dec. 31, 2003

(65) Prior Publication Data

US 2005/0071282 A1 Mar. 31, 2005

Related U.S. Application Data

(60) Provisional application No. 60/520,022, filed on Nov. 13, 2003, provisional application No. 60/506,992, filed on Sep. 29, 2003.

(51) Int. Cl.
H04L 9/32 (2006.01)
(52) U.S. Cl. .......................... 726/5; 713/182
(58) Field of Classification Search ........................ None
See application file for complete search history.

(56) References Cited

U.S. PATENT DOCUMENTS 6,269,395 B1 * 7/2001 Blatherwick et al. ........ 709/219

2003/0172090 A1 * 9/2003 Asunmaa et al. ............ 707/200

OTHER PUBLICATIONS

Urien, P, "Internet card, a smart card as a true Internet node", Computer Communications 23 (2000), 1655-1666.
Jesdanun, A., "Theif captures keystroke to access accounts", Seattle Post-Intelligencer, Jul. 2003, http://www.seattlepi.nwsource.com/national/131961_snoop23.html.
Federal Trade Commission, "Identity Theft Survery Report", Sep. 2003, http://www.ftc.gov/os/2003/09/synovatereport.pdf.
"Kerberos: The Network Authentication Protocol", http://web.mit.edu/kerberos/www/.
"Windows Live ID", Microsoft http://www.passport.net/.

* cited by examiner

*Primary Examiner*—Nasser Moazzami
*Assistant Examiner*—Brandon S Hoffman
(74) *Attorney, Agent, or Firm*—Pehr Jansson; The Jansson Firm

(57) ABSTRACT

A system and method for effecting secure transactions over a computer network in a manner designed to foil identity theft perpetrated from an untrusted computer. A connection from a client computer to the network wherein the client computer provides a user interface for a user, a connection from a server computer to the network, and a connection from a portable secure computing device to the network provides for secure transmission of private confidential user information from the user to a server. The private information is transmitted directly from the secure computing device to the server over the secure connection without possibility of capture on the computer with which the user is interacting.

21 Claims, 6 Drawing Sheets

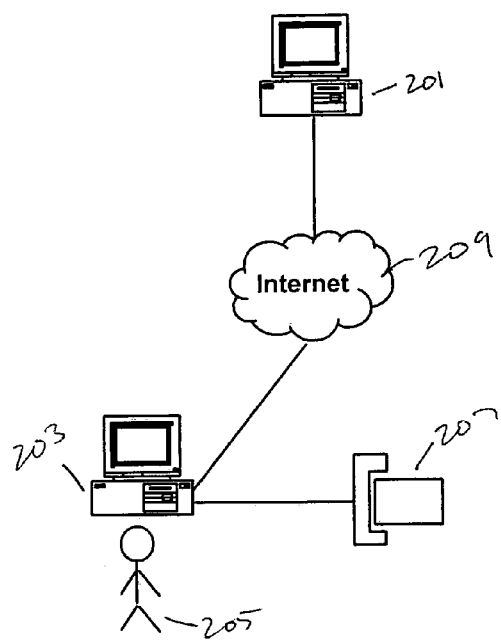
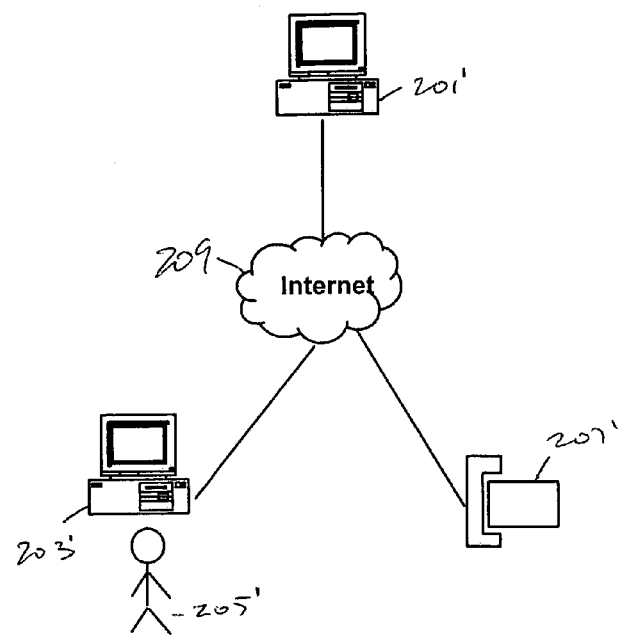
Figure 2(a)
Figure 2(b)

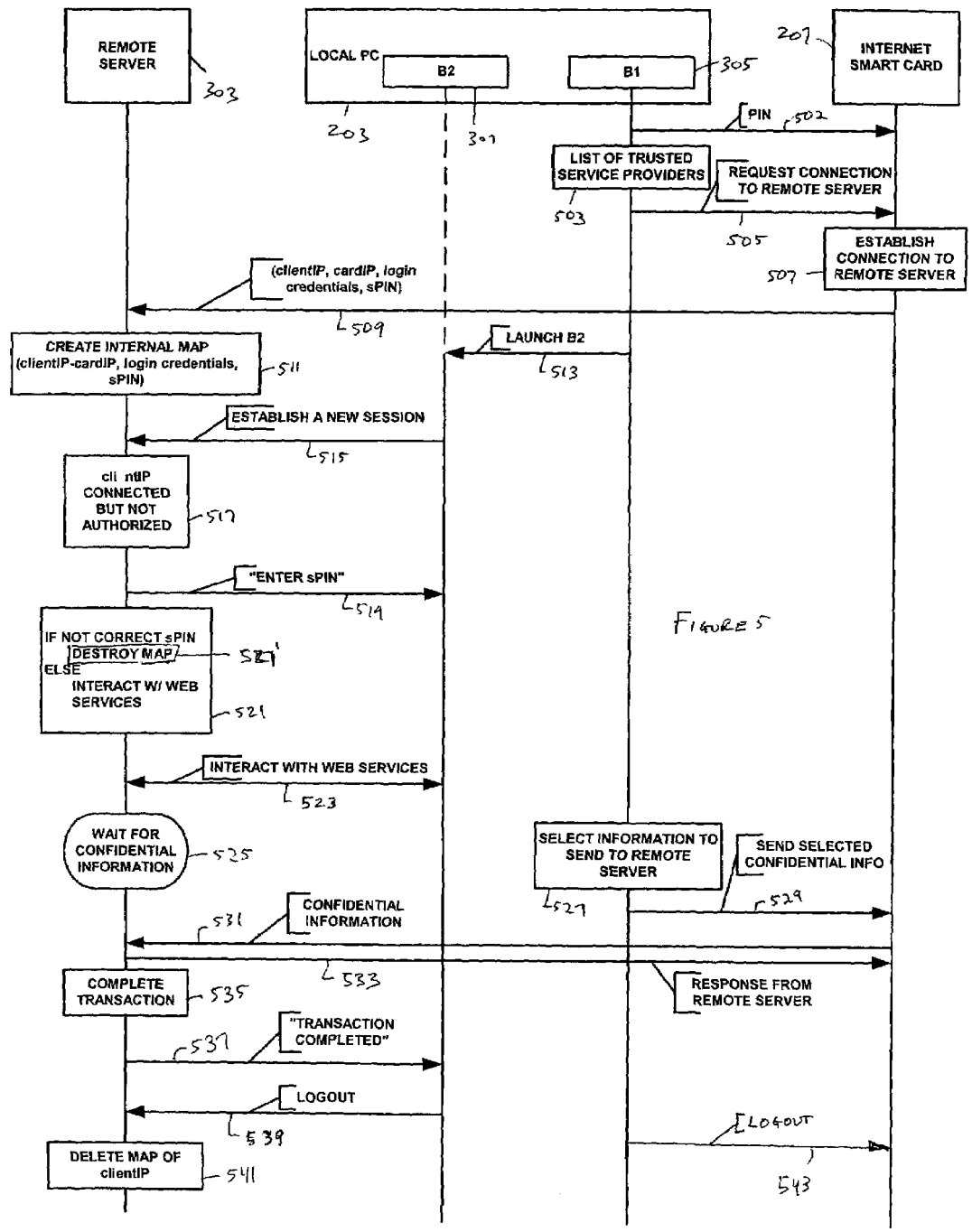

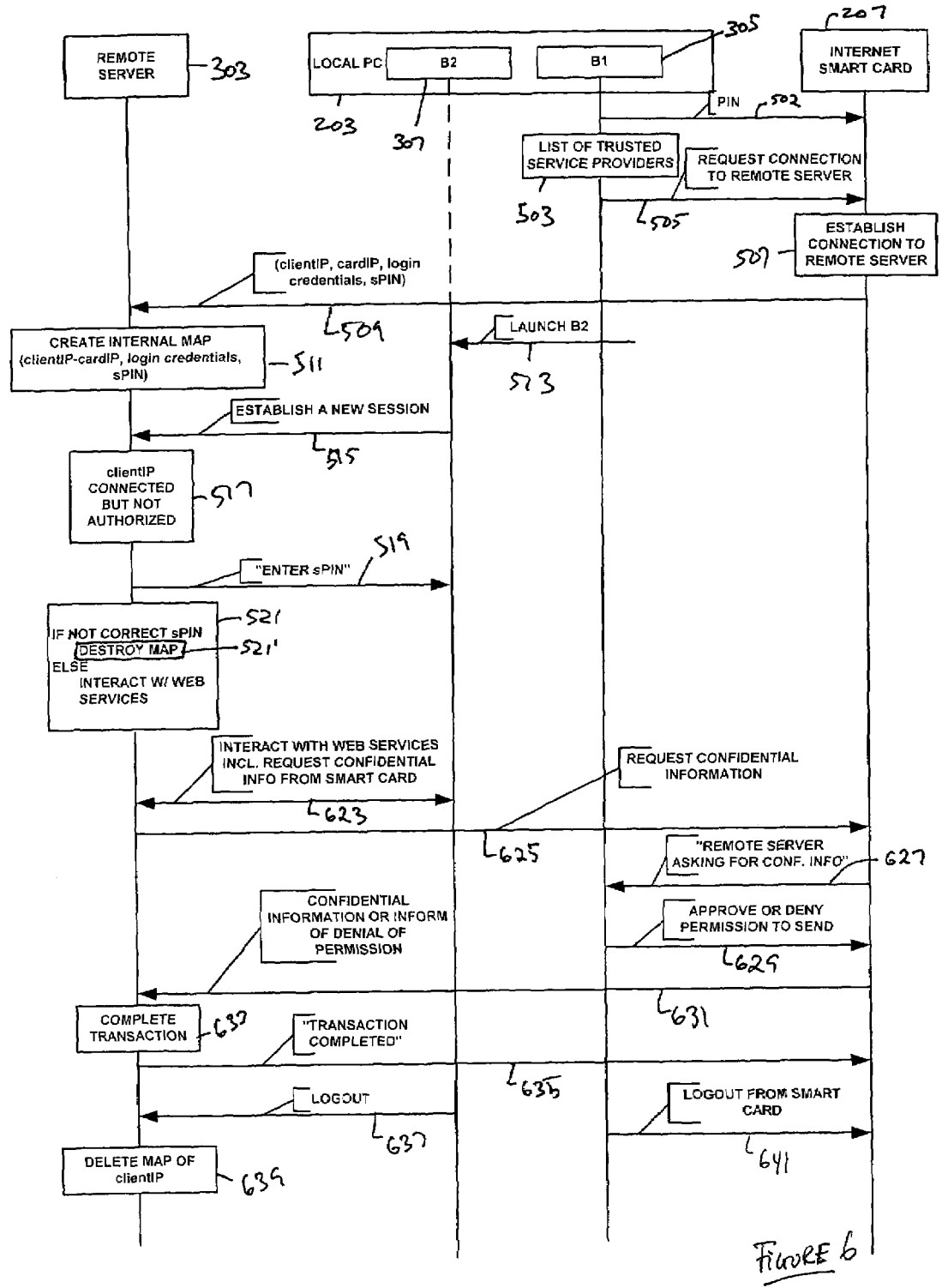

SYSTEM AND METHOD FOR PREVENTING IDENTITY THEFT USING A SECURE COMPUTING DEVICE

CROSS-REFERENCE TO RELATED APPLICATIONS

This application claims the benefit of priority from U.S. Provisional Application Nos. 60/520,022 filed on Nov. 13, 2003 and 60/506,992 filed on Sep. 29, 2003 the entire contents of which are hereby specifically incorporated by reference.

TECHNICAL FIELD

This invention relates in general to the field of computer networks, and in particular to a system and method for preventing identity theft during interaction over a computer network.

BACKGROUND OF THE INVENTION

Commerce over computer networks has become very popular. Such commerce takes many forms, from purchasing books and merchandize from on-line vendors such as books from amazon.com and hockey equipment from epuck.com to conducting online banking and stock trading. Common to all such transactions is the need to communicate private secure information. Typically, the transactions are carried out over secure encrypted connections. However, there are still opportunities for the devious to contrive schemes to capture the private information that is used during online transactions, for example, to obtain passwords, personal identification numbers (PIN), Social Security Numbers, driver's license numbers and account numbers. Illegal procurement of such information and using such information in a fraudulent manner is commonly referred to as identity theft. According to the Federal Trade Commission, in the year 2002 alone, there were 9.9 million identity theft victims. The thefts cost businesses $47.6 billion and $5 billion in out-of-pocket expenses to individuals in 2002 (Federal Trade Commission, "Federal Trade Commission Identity Theft Survey Report," September, 2003,).

Transactions over the Internet will be used herein for exemplary purposes. While the Internet is by far the largest and most pervasive computer network, the problems and solutions discussed herein can occur and apply on other networks as well. For example, identity theft can occur entirely within the confines of a corporate network or a university network wherein a dishonest individual uses an across-network transaction to steal PIN's giving access to employee or student records. While it is convenient to discuss the identity theft problem in the context of the Internet, that should not be construed to limit the scope of this invention.

One form of conducting online identity theft is to use keystroke logger to log individual keystrokes and to extract information, such as password and credit card number, from the logs. Two known cases are the Kiniko's case in New York and the Boston College case (Jesdanun, A., "Thief captures every keystroke to access accounts," Seattle Post, July, 2003, Poulsen, K., "Guilty Plea in Kinko's Keystroke Caper," SecurityFocus, Jul. 18, 2003). In both cases, the thieves installed keystroke logger software in public Internet computers, in Kinko's stores or in the college campus. They captured user ID's, user names, and passwords, using them to access or even open bank accounts online, making purchases, and entering buildings illegally.

The keystroke logger is either software that one installs on a computer, or a piece of hardware that one connects between the keyboard cable and the computer, or a hardware that is built into the keyboard. Online identity thieves typically use software keystroke logger because it is invisible to the user.

In a typical online transaction, creating a new account or accessing an existing account, a user does the online transaction through a graphical human interface on the computer screen and using a keyboard to enter information requested by the human interface. This graphical human interface typically represents an Internet client application of a bank or an online retailer. The user types in confidential personal information, such as name, password, social security number, credit card number, and so on, using the keyboard. This confidential information flows in clear text from the keyboard to the computer. The Internet client application may use the computer or the smart card connected to the computer to encrypt the information before sending to the remote server. But the keystroke logger or screen capturer could capture the confidential personal information before it is encrypted. Many of the current security mechanisms assume the computer and its keyboard or other input devices are secure, which might not be true.

FIG. 1 illustrates the identity theft problem that can be achieved using a keyboard logger or similar program or hardware. FIG. 1(a) is a schematic of the normal information from a keyboard 101. The information might be displayed on a screen 103 connected to a computer 105 used by a customer of an online service, e.g., a bank e-commerce site. A cryptographic processor 107 either in the computer 105 or in a smart card (not shown) might also encrypt the information before it is sent to the Internet 110. This cryptographic processor 107 can either be a hardware device or implemented entirely in software running on computer 105. FIG. 1(b) illustrates the information flow when keystroke logger software 109 is installed on the computer 105. The keystroke logger 109 captures the information typed in on the keyboard 101 by the user before the information goes anywhere else, and hence, before the existing security mechanism is applied, e.g., before the cryptographic processor 107 has a chance to even encrypt the information. FIG. 1(c) illustrates the configuration and the information flow when a hardware keystroke logger 111 is installed. The hardware keystroke logger 111 is between the keyboard 101 and the computer 105. Alternatively, the hardware keystroke logger 111 may be built into the keyboard 111. In both cases, the information is captured before it enters the computer 105.

A related problem to keyboard loggers is presented by various forms of malicious software (malware) or unwanted code that anti virus software is powerless to fight. These unwanted code, such as keystroke logger, spyware, snoopware, Trojan, and so on, are invisible and non-reproducible. This kind of software may be installed locally or distributed remotely. Some keystroke logger, for example, not only record keystrokes silently but also transmit the key logs to a remote Internet node silently. A variety of anti-non-virus malware programs, such as anti-keyloggers, fight against these unwanted code. Most these products detect and fight against known malicious programs. On the other hand, cleverly designed malicious programs may have anti-detection mechanisms to fight back. New malicious software comes out and requires the development of new anti-malicious software. The battle is similar to the fight between bacteria and antibiotics in medicine.

There are several prior art approaches for providing secure Internet commerce and other online transactions. One method is to ensure that all messages between two nodes involved in a transaction are encrypted. If one of the Internet nodes is compromised by malicious software, which captures the message before it is encrypted, the secure communication mechanism does not help because it is too late. For example, encryption does not solve the problem of identity theft that is perpetrated using keyboard loggers, screen capture and other techniques for capturing the information entered by a user of a computer because, as discussed above, the encryption is performed too late, namely, after the information has already been captured.

Another form of protecting the security of online commerce is the authentication of an individual involved in a transaction, for example, though identity federation or federation of authentication, such as Kerberos ("Kerberos: The Network Authentication Protocol,") and Microsoft Passport (Microsoft .Net Passport, Microsoft Cooperation,). However, these mechanisms also do not protect against keyboard loggers and similar schemes.

In an effort to stem the growth in credit card fraud and raise consumer confidence during online transactions, several credit card companies (e.g. Citibank) are providing virtual credit card numbers. These credit card numbers are for one-time use only and help protect the user's actual credit card number during an online transaction. Instead of using the actual number, the user enters the virtual number when shopping online. Even if the virtual number is stolen it is of little use since it cannot be reused after the first transaction.

Although this approach helps protect the user against malicious use of his actual credit card number, it has two drawbacks with respect to a broader identity theft prevention framework. First, the approach is limited to credit card numbers and cannot be extended to other confidential information. Secondly, in order to get a one-time use credit card number, the user still has to authenticate himself to the bank. This online authentication process itself can be a weak link because it is suspect to keyboard logger attacks. Malicious users can impersonate the user and get virtual credit card numbers on his behalf. In this scenario, user's actual credit card number is secure, but his identity is not.

Smart cards may also be used to improve online security. A smart card is a tamper resistant, secure, and portable microprocessor card. It has been used for security in a variety of applications (Jurgensen, T. M. and Guthery, S. B. *Smart Cards*, Pearson Education, Inc., 2002.). The smart card is a security token for computer and network access, and for secure communications. When using the smart card, the card is connected to a host computer. Using Public Key Infrastructure (PKI) to secure communication, the card keeps the private key of its owner. To send a message from one user to another user through Internet, the computer of the sender generates a random shared key, encrypts the message using the shared key, and encrypts the shared key using the receiver's public key. Both the encrypted message and the encrypted key are sent to the receiver. The receiver's computer uses the receiver's private key stored in the receiver's smart card to decrypt the encrypted shared key. It then uses the shared key to decrypt the message. In this way, only the intended receiver can read the message. However, if a keystroke logger compromises the user's computer, the logger would capture the information before the smart card mechanism is applied.

Another existing method is to store user's confidential information on the smart card. For online transactions, the middleware running on the computer obtains the information from the smart card and fills in the appropriate fields in a web form. This approach requires special software on the computer. It does not provide any more security than manual entry of the web form because the confidential information is in an unencrypted form in the web browser. In this respect, it is a convenience feature instead of a security feature.

Thus, there is a need for further systems and methods for combating identity theft that can be achieved by employing a keyboard logger at a public workstation and thereby capturing a user's private information that the user used in carrying out secure transactions over the internet.

SUMMARY OF THE INVENTION

In a preferred embodiment, the invention provides a mechanism for allowing a user of an online service to transmit confidential personal information necessary to transact business with that online service without having to enter that confidential personal information in a manner that is subject to being captured by a keyboard logger or similar software or hardware device. In the preferred embodiment, the confidential private information is stored in an Internet smart card under the physical control of the user. The user directs the smart card to transmit the confidential private information to the server of the online service over a secure connection. The confidential private information never exists in an unencrypted form on the computer used by the user for conducting the transaction.

A system and method for effecting secure transactions over a computer network in a manner designed to foil identity theft perpetrated from an untrusted computer. A connection from a client computer to the network wherein the client computer provides a user interface for a user, a connection from a server computer to the network, and a connection from a portable secure computing device to the network provides for secure transmission of private confidential user information from the user to a server. The private information is transmitted directly from the secure computing device to the server over the secure connection without possibility of capture on the computer with which the user is interacting.

BRIEF DESCRIPTION OF THE DRAWINGS

FIGS. 2(*a*) and (*b*) are illustrations of two alternative physical configurations employed in a preferred embodiment of the invention.

FIG. 5 is a timing and data-flow diagram illustrating the push model for transmitting confidential private information from an Internet smart card to a remote server according to the invention.

FIG. 6 is a timing and data-flow diagram illustrating the pull model for retrieving confidential private information from an Internet smart card by a remote server according to the invention.

DETAILED DESCRIPTION OF THE PREFERRED EMBODIMENTS

Figure 1A:
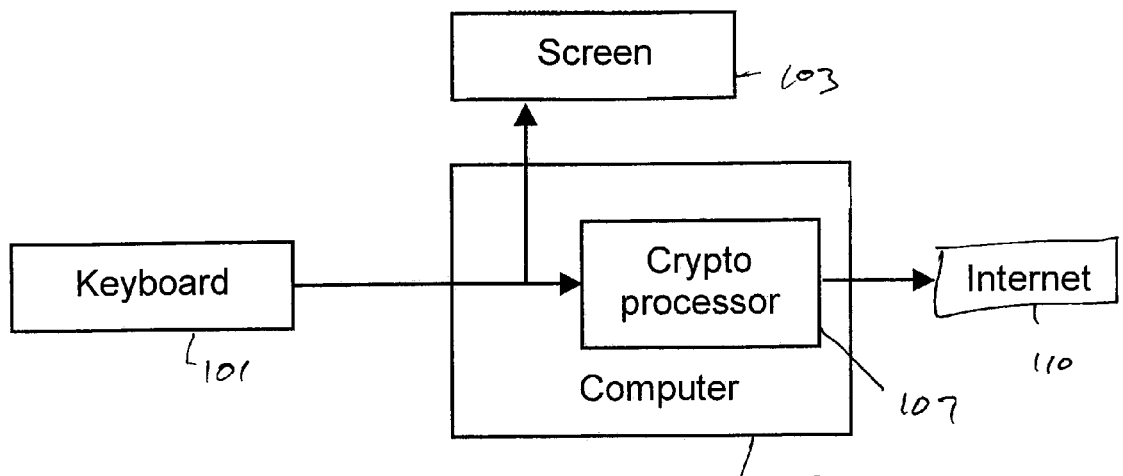
FIG. 1(*a*), 1(*b*), and 1(*c*) are illustrations of how identity theft can be achieved using a keyboard logger or similar program or hardware.
Figure 1B:
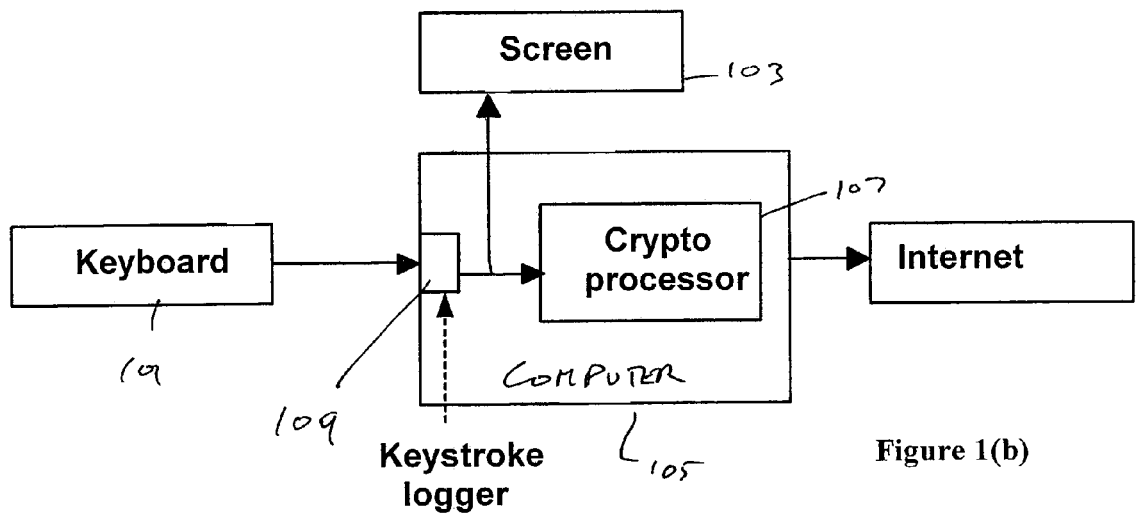
Figure 1C:
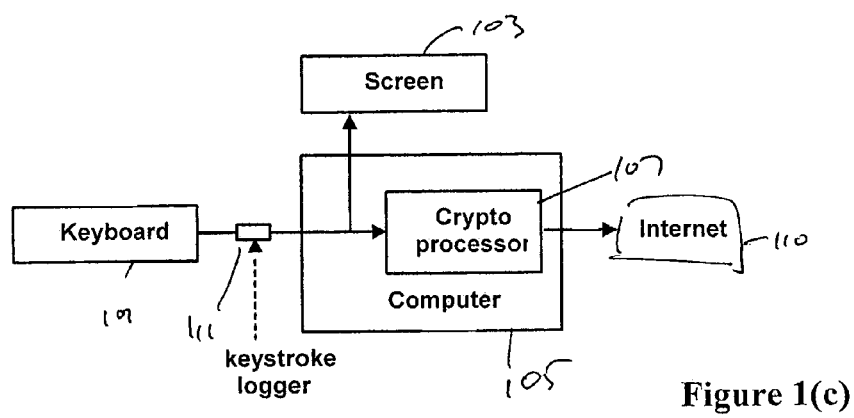

The present invention prevents identity theft perpetrated using keyboard loggers, screen capture, remote monitoring, and even from persons looking over a user's shoulder by providing a mechanism for avoiding having confidential information such as passwords, social security numbers, bank account numbers, credit card numbers from ever being entered by a user of a workstation when making secure transactions over the Internet.

The online identity theft with logging mechanism is possible because unencrypted confidential information is present in the computer for certain duration, however small. A malicious user may gain access to the confidential information before any security mechanism is applied. However, the logging mechanism will not work, if the confidential information, such as password, SSN, credit card numbers, and so on, never appear in clear text in the computer or online. The notion of providing a mechanism that permits a user to avoid ever entering such confidential information is the basic idea behind the present invention. One component of a preferred embodiment of the invention is an Internet smart card to store confidential personal information. When needed and authorized by the owner of the card, the information flows securely from the card to the remote Internet client or server without ever being displayed or keyed at the user's workstation. The card encrypts and decrypts the information entirely internal to the card. Although the information is transmitted through the computer that the user is using for online transaction, the information is encrypted before it enters that computer and, hence, remains secure. From information passing perspective, the user's computer is just another router on the network.

The Internet smart cards can combat the keystroke-logging problem (and related problems) because an Internet smart card is a portable secure network node. One must physically own the card, have its PIN number, and/or be the owner of the biometrics store in the card in order to use it. There are several levels of security: what I know, what I have, who I am. Thus, by providing a mechanism that utilizes both knowledge of a PIN and possession of a card, or even identity demonstrated through a biometric, security is enhanced. It is further enhanced by never providing the associated information other than in a totally encrypted fashion, end-to-end, even not to the computer being used by a user conducting some form of online commerce.

For any online account transaction, for example, application for a new account or accessing an existing account, instead of typing in confidential personal information which could be snooped through a keyboard logger, screen capture, or even someone looking over a user's shoulder, according to the invention, a user establishes a secure Internet connection between the user's smart card and a remote secure server of a service provider, for example, the server of a bank or online merchant. Through the interface of the Internet client application, for example, a web browser, the user decides what information to enter directly and what information that the server can get from the smart card (or that the smart card sends automatically to the server). For example, for SSN or credit card number, a user can choose to send that information from smart card directly to the server. This highly confidential personal information is first encrypted in the smart card. During the transaction, the local computer never sees the confidential personal information stored on the card in its original form, nor do people looking over the user's shoulder, nor does the thief who captures every key stroke, every screen shot, or other parts of the computer.

To access to the Internet smart card, the user does need to enter the PIN code or his biometrics. Even if the host computer is compromised and the PIN code is captured, the thief can hardly do anything with the PIN because he does not have the card. In addition, most captured information is analyzed off-line. It is extremely hard, if not impossible, to figure out which PIN is for which smart card.

FIGS. 2(a) and (b) are illustrations of two alternative physical configurations employed in a preferred embodiment of the invention. A remote server runs on a remote computer 201 or 201'. The local client runs on a local computer 203 or 203' that a user 205 or 205' is using. In either case both the computers 201 and 203 are connected to the Internet 209. An Internet smart card 207 or 207' is connected to the Internet 209 either by connecting directly to the local computer 203, which acts as a router, or, by connecting to another device (not shown). The connection to the Internet 209 might be wired or wireless.

Herein below, the remote computer, the local computer, the Internet smart card, and the user will be referred to by using the un-primed reference numerals. However, such references refer to both scenarios presented in FIG. 2(a) and 2(b) as well as any other equivalents.

Figure 3:
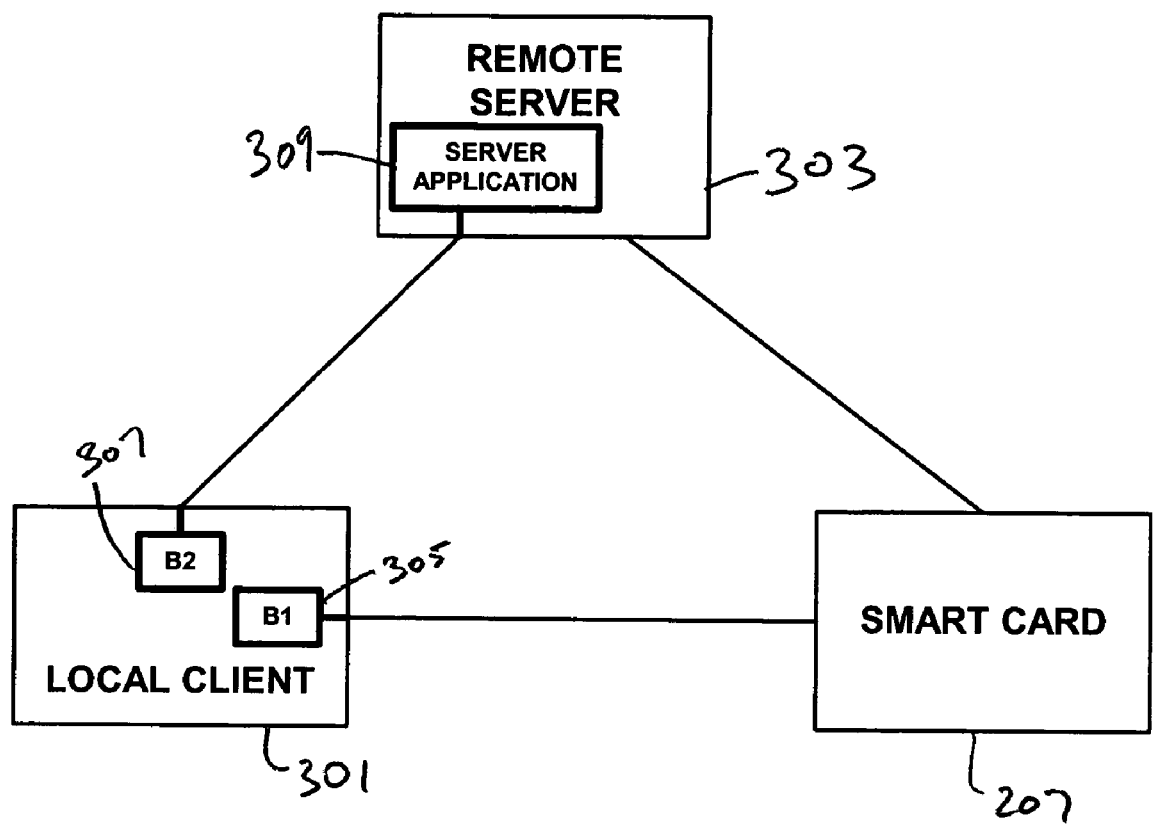
FIG. 3 is a graphical illustration of the logical connections over the Internet using an Internet smart card according to the invention.

FIG. 3 is a graphical illustration of the logical connections over the Internet using an Internet smart card according to the invention. The user uses one web browser 305, running on a local computer 301, to connect to user's Internet smart card 207. The user can request the user's smart card 207 to establish a secure connection with the remote secure server 303, can authorize transactions, and can monitor transactions. The Internet smart card 207 connects to the remote secure server 303 as requested by the user, i.e., its owner. All data transactions transmitted over a secure connection. The user's confidential personal data is encrypted and decrypted in the smart card 207 and in the remote secure server 303. The local computer 301 is one of the nodes in the Internet 209. The user uses another web browser 307 to connect to the remote server 303 that runs a server application 309.

This mechanism is applicable to all types of electronic transactions using the Internet, for example, creating a new account and accessing an existing account. The card owner determines the kind of personal information kept inside the card 207. For example, the card 207 may contain passwords, SSN, and credit card numbers. Because the information is encrypted/decrypted inside the smart card 207 or inside the remote secure server 303, the information is concealed from the local computer 203 that the user uses. The keystroke logging or other logging mechanism cannot obtain the confidential personal information necessary to complete the transactions.

One feature of an embodiment of the invention is to establish a secure Internet connection between a smart card 207 and a remote server 303 of a service provider and to send encrypted information between the smart card 207 and the server 303 directly via the secure connection. Two alternative embodiments include (1) the card 207 sends the confidential personal data to the remote server 303 and (2) for the remote server 303 to retrieve the data from the card 207.

While the preferred embodiments are described using Internet smart cards, the systems and methods of the invention also apply to other secure tokens.

Internet Smart Card 207

An Internet smart card 207 is described in greater detail in co-pending patent application 60/506,992 entitled SECURE NETWORKING USING A RESOURCE-CONSTRAINED DEVICE. A smart card is a tamper resistant, secure, and portable microprocessor card. The Internet smart card 207 is, in addition, a secure Internet node as described in patent application 60/506,992. Accordingly, it is possible to establish secure Internet connections between the Internet smart card 207 and other Internet nodes. The security boundary is inside the Internet smart card 207. For example, the Internet smart card has implementation of either SSL or TLS. Thus, a secure SSL/TLS connection can be established between the card 207 and another Internet node, e.g., the remote server 303. This is effectively an SSL VPN from the card 207 to a remote application, e.g., the server application 309.

In one embodiment of the invention, the user information is stored on the smart card 207 during the card's personalization process. A post issuance personalization might also store additional personal information on the card 207 after the card is issued or modify information on the card 207 in a secure manner. The user can also customize the smart card using a secure computer, for example, changing the PIN. The smart card only gives out information to trusted clients or servers at the user's authorization.

In a preferred embodiment, the Internet smart card 207 is able to do the following:

1. Establish secure connections with an Internet client and an Internet server concurrently. The card is a server with respect to the Internet client. It can be a client or a server with respect to the remote server.
2. Securely communicate with the Internet client.
3. Securely communicate with the Internet server directly. The smart card encrypts data inside the card, sends the encrypted data to the other Internet node, and decrypts the data inside the card.
4. Notify the user, through the client application, when the remote server tries to get information. Only give out information when the user authorizes it.

It is important that mutual authentication be performed when the Internet smart card 207 is connected. With SSL, client authentication is optional. However, with the Internet smart card 207 as a server, client authentication is mandatory. Otherwise, if only server authentication is performed, the client is protected, but the smart card 207 is not protected.

Internet Client Application

The web browsers 305 and 307 are Internet client applications. They are local clients that run on local computer 301. The user 205 uses a web browser to access services provided by an Internet service provider. The technique presented in this paper does not require any changes to the standard web browsers, such as Internet Explorer, Netscape, Safari or Mozilla. The only requirement for the web browser is to support HTTPS connections. The user 205 uses one instance 307 of the web browser to connect to a remote server 303 of a service provider and uses another instance 305 of the web browser to connect to his Internet smart card 207.

User Interactions

The technique of preventing identity theft according to one embodiment of the invention provides for particular user interaction as the user 205 interacts with the remote secure server 303 through the Internet client application, such as a browser. For confidential personal information, instead of typing in, the user 205 can choose to send the information from his Internet smart card 207 to a trusted server, e.g., remote server 303, directly. For example, the user 205 may do the following steps to perform an online transaction according to the invention, for example, to create a new account or access an existing account at a bank:

1. Establish a secure connection from a web browser (B1) 305 to the user's Internet smart card 207. The PIN number or biometric information is used for the smart card 207 to identify the user 205.
2. Request, through browser (B1) 305, the smart card 207 to establish a secure connection with the remote secure server 303.
3. Start another web browser (B2) 307 and establish a secure connection from B2 307 to the remote server 303. When prompted, the user 205 enters a shared secret value.
4. Fill in a requested form in B2 307, for example, a form for creating a new account, or a form to access an existing account. For confidential personal information, for example, the social security number or a credit card number, the user 205 chooses to send data from the smart card 207 to remote server 303 directly and securely.
5. From browser B1 305, select the information stored in the smart card 207 that in turn sends the information to the remote server 303.
6. When finished, the user 205 logs out from both browser instances, B1 305 and B2 307.

Section on Workflow below contains a more detailed description of the interactions between the user 205, the browser instances 305 and 307. At the stage of connecting with the smart card (step 1. above), even if the host computer 203 (on which the local client application, browser B1 305, executes) is compromised and the PIN code is captured, for example, through a keyboard logger, the thief can hardly do anything with the PIN because he does not possess the card 207. In addition, most captured information is analyzed off-line. It would be extremely difficult, if not impossible, for whoever had captured the PIN to determine which smart card the PIN is for.

Association Between the Smart Card 207 and the User 205 from the Perspective of the Remote Server 303

The remote server 303 of a service provider can typically serve multiple client applications from different Internet nodes simultaneously. Hence, the remote server 303 may connect to multiple Internet smart cards 207 at the same time. To secure transactions among the client application 307, the smart card 207 and the remote server 303, the preferred embodiment of the invention provides a mechanism to address the following questions:

1. How does a user 205 let the remote server 303 associate his client application 307 with his smart card 207 for a particular session, where the client application 307 resides in a different Internet node 203 from his smart card 207?
2. How to prevent one user 205, through his client application 307, to associate with other user's smart card?

Figure 4:
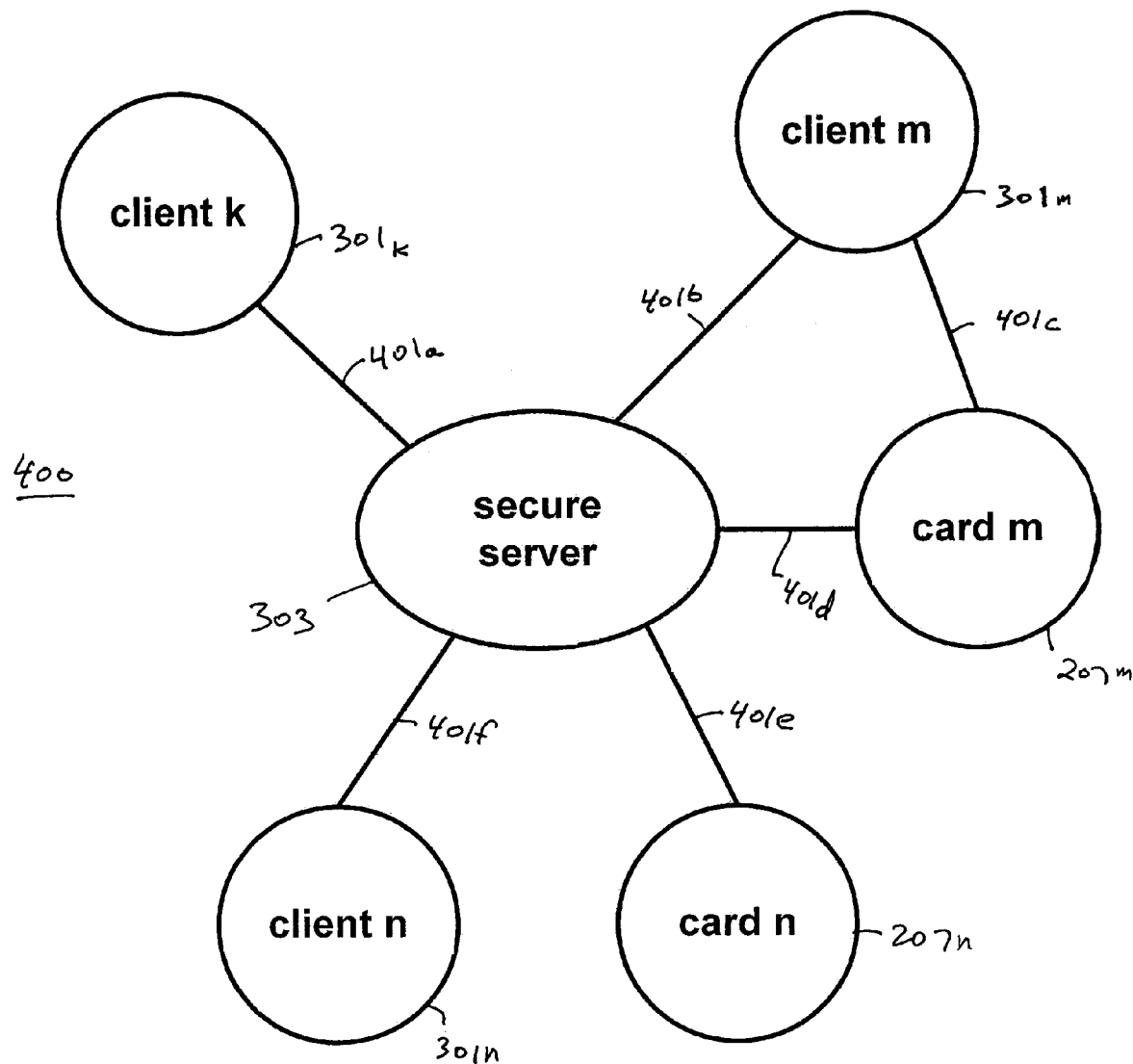
FIG. 4 is a graphical illustration of the secure logical connections among a server and multiple clients and smart cards according to the invention.

FIG. 4 is a graphical illustration of the secure logical connections among a server and multiple clients and smart cards according to the invention. The nodes in the graph 400 represent the server 303, a client 301, or a smart card 207 (where the letter designations (k, m, n) are used to indicate different instances of similar devices).

All the connections are secure and each has associated with it a unique shared secret. An edge 401 {node i, node j} is, therefore, specified by a channel, which is a quadruplet {(node i IP address and port number), (node j IP address and port number)}, and the shared secret between node i and node j. Each node knows and only knows those edges that connect to the node. The above questions can be restated as follows:

1. How does the remote secure server 303 associate client n (301*n*) with card n 207*n*?
2. How to prevent the client node k 301*k* to ask the server node 303 to associate with card 207*n*?

As mentioned before, the user 205 requests his Internet smart card 207 (card n) to initiate a connection between the card 207 and the remote server 303. The card 207 sends to the remote server 303 the user's login credential, the IP address of the client node (client n) and a secret PIN (sPin). The remote server 303 uses the information to establish an association among the user 205, the client node 301 and the smart card 207. When the user 205 accesses the remote server 303 via the web browser 307 (client n 307*n*), he enters the sPin. From the IP address of the client node 301 and the secret PIN, the remote server 303 maps to the smart card 207*n* of the user 205 (card n). A malicious user, client k 301*k*, may pretend to connect to the server 303 via the IP address of client n, but he does not have the secret PIN and cannot establish the association.

The owner of each Internet smart card 207 controls the secret PIN for that card. The remote server 303 maintains a record of the secret PIN for one session only. The user-client-card association that includes the secret PIN is removed when the session is finished. For security, this secret PIN should be different from the smart card PIN that the user uses to log into the card.

This secret PIN acts as a shared secret between the user 205 and the Remote Server 303 during the session. The user knows this secret because it comes from his Internet smart card. He has control over the sPIN for each of the trusted service providers stored in the card. The remote server 303, on the other hand, knows this secret because it was passed to the remote server 303 securely from the smart card 207.

If the user 205 is on a public PC that is compromised, any keystroke he types may be captured and stored without his knowledge. With the conventional username/password login mechanism, a malicious person can use the captured username/password to log into the user's account at the remote server. The username/password persists on the remote server. On the other hand, the sPin is a one-time PIN from the remote server's perspective. Therefore, even if the sPin is captured, it cannot be used to login again without the Internet smart card 207.

If sPin is not used, a malicious code could potentially send a login request to the remote server 303 pretending to come from the same IP address as the local PC. This malicious code may gain access to the remote server 303 and obtain confidential information from user's Internet smart card 207. The use of the sPIN closes this potential loophole.

Workflow

As mentioned above there are two alternative embodiments of the invention in regard to whether the confidential information is pulled by the remote server 303 (the pull model) or pushed to the remote server 303 (the push model) In both cases the information flows from the internet smart card 207 to the remote server 303. The push model can be used in most network configurations where an Internet smart card 207 has an IP address and is connected to the Internet 209. However, the pull model can be used only if Internet smart card 207 is globally accessible from outside the LAN to which it is connected.

FIG. 5 is a timing and data-flow diagram illustrating the push model in which the smart card 207 pushes confidential personal data to the remote server 303 and illustrates the interaction of three key elements in this model, namely, the local PC 203, the Internet smart card 207 and the remote server 303 of a service provider. In the push model, the IP address of the Internet smart card 207 may or may not be accessible from outside of the LAN to which the smart card 207 is connected. All arrows indicating inter-element interactions represent HTTPS connections using SSL/TLS protocol.

1. The user 205 starts a web browser B1 305 on the local PC 203. The browser B1 305 acts as an Internet client application.
2. From B1 305 the user connects to the Internet smart card 207 and authenticates himself using his PIN over a secure HTTPS connection, step 502.
3. Once authenticated, the user 205 is presented with a list of trusted service providers 503. The user picks a service provider and asks the Internet smart card to establish a secure connection with this service provider, step 505.
4. The Internet smart card 207 knows the IP address of the remote server 303 that corresponds to the selected service provider. The card 207 establishes a secure connection with remote server 303 using SSL/TLS protocol, step 507, and sends the following data 509 stored on smart card to the remote server 303:
   a. clientIP: IP address of the Local PC 203
   b. cardIP: IP address of the Internet smart card 207
   c. login credentials: These credentials allow the user 205 to be authenticated on the remote server 303. Examples of these credentials can be username and password.
   d. sPin: A shared secret PIN, which provides an additional level of authentication when the user actually initiates a session with the remote server 303.
5. After receiving the data 509 sent to it in step 4, the remote server 303 creates an internal map linking the clientIP with other three attributes; cardIP, login credentials, sPin, step 511.
6. The user 205 now clicks on a link in B1 305 to launch (step 513) another instance, B2 307, of the web browser with the URL set to authentication page of the remote server 303.
7. The second browser instance B2 307 connects to the remote server 303 to request a new session, step 515.
8. After receiving the new session request from local PC 203, the remote server 303 can determine that the request is coming from same clientIP address as passed to it in step 4 in message 509. The remote server 303 flags the mapping of this clientIP as "connected", but not "authorized" as yet, step 517. Connected means that user has connected from the corresponding IP address and since only one connection is allowed, any subsequent connection requests will not be honored.
9. To authorize the current session, the remote server 303 sends a message 519 to the user 205 asking the user 205 to enter the sPin corresponding to this connection.
10. Next the remote server 303 determines whether the user 205 can be authenticated and allowed to continue the transaction, step 521. If the sPin entered by the user 205 matches the one in the map for clientIP, the user 205 is logged-in using the appropriate credentials, which are also stored in the same map. The workflow can now continue with step 12 (illustrated in FIG. 5 as element 523).
11. If, however, the sPin entered by the user 205 does not match the one in the map, the remote server 303 closes the connection to the user 205. Access is not allowed. In addition the map linking clientIP to a specific user account and Internet smart card is destroyed, step 521'. Subsequent steps listed below become irrelevant.
12. Once access is granted, the user 205 can now interact 523 with the web services provided by the remote server 303 through browser B2 307. One step in this interaction can be to request that some confidential information (e.g. user's credit card number and expiration date) be retrieved from Internet smart card instead of being typed manually. The user 205 indicates to the remote server 303 that Internet smart card 207 will send this information.

13. The remote server 303 now waits 525 for the confidential information to arrive from the Internet smart card 207. The transaction at the remote server 303 as well as the user interface on the web browser B2 307 will be in waiting mode.
14. The user 205 now switches to browser B1 305 that is connected to the web server on Internet smart card. The user 205 selects, step 527, the confidential information to send to the remote server 303 and interacts, message 529, with the card 207 to instruct the card to send the confidential information that should be sent to the remote server 303. This is the same information that the remote server 303 is waiting for.
15. The smart card 207 sends the selected information to remote server, step 531, reads the response, message 533, from the remote server 303. The response may include the status of the transaction and any additional information that the remote server 303 wants to send back.
16. The remote server uses the confidential information received in message 531 to complete the transaction, step 535, that was put in a waiting state in step 13.
17. The remote server 303 sends an update message 537 to the browser B2 307 to cause it to update the user interface on the browser B2 307 to indicate that the requested transaction has been completed.
18. The user 205 logs out from the remote server 303, message 539.
19. After receiving the user logout request 539, the remote server deletes the mapping of clientIP, step 541. This prevents subsequent transactions being sent to smart card 207.
20. The user 205 logs out, message 543, from his Internet smart card 207 and may remove the smart card 207 from the reader.

The Pull Model

In the pull model the Internet smart card 207 is connected to a network 209 in such a way that it is accessible from outside of the LAN to which it is connected. This allows external clients to connect to the web server on the Internet smart card 207 and to pull confidential information. FIG. 6 is a timing and data-flow diagram illustrating the pull model in which the remote server 303 pulls confidential personal data from the Internet smart card 207 and illustrates the interaction of three key elements in this model, namely, the local PC 203, the Internet smart card 207 and the remote server 303 of a service provider. As in FIG. 5, all arrows indicating inter-element interactions represent HTTPS connections using SSL/TLS protocol.

Several steps (number 1 to 11) in pull model are identical to the push model, but are repeated here for completeness. Similarly like elements and actions bear the same reference numerals in FIGS. 5 and 6.

1. The user 205 starts a web browser B1 305 on the local PC 203. The browser B1 305 acts as an Internet client application.
2. From B1 305 the user connects to the Internet smart card 207 and authenticates himself using his PIN over a secure HTTPS connection, step 502.
3. Once authenticated, the user 205 is presented with a list of trusted service providers 503. The user picks a service provider and asks the Internet smart card to establish a secure connection with this service provider, step 505.
4. The Internet smart card 207 knows the IP address of the remote server 303 that corresponds to the selected service provider. The card 207 establishes a secure connection with remote server 303 using SSL/TLS protocol, step 507, and sends the following data 509 stored on smart card to the remote server 303:
    a. clientIP: IP address of the Local PC 203
    b. cardIP: IP address of the Internet smart card 207
    c. login credentials: These credentials allow the user 205 to be authenticated on the remote server 303. Examples of these credentials can be username and password.
    d. sPin: A shared secret PIN which provides an additional level of authentication when the user actually initiates a session with the remote server 303.
5. After receiving the data 509 sent to it in step 4, the remote server 303 creates an internal map linking the clientIP with other three attributes; cardIP, login credentials, sPin, step 511.
6. The user 205 now clicks on a link in B1 305 to launch (step 513) another instance, B2 307, of the web browser with the URL set to authentication page of the remote server 303.
7. The second browser instance B2 307 connects to the remote server 303 to request a new session, step 515.
8. After receiving the new session request from local PC 203, the remote server 303 can determine that the request is coming from same clientIP address as passed to it in step 4 in message 509. The remote server 303 flags the mapping of this clientIP as "connected", but not "authorized" as yet, step 517. Connected means that user has connected from the corresponding IP address and since only one connection is allowed, any subsequent connection requests will not be honored.
9. To authorize the current session, the remote server 303 sends a message 519 to the user 205 asking the user 205 to enter the sPin corresponding to this connection.
10. Next the remote server 303 determines whether the user 205 can be authenticated and allowed to continue the transaction, step 521. If the sPin entered by the user 205 matches the one in the map for clientIP, the user 205 is logged-in using the appropriate credentials, which are also stored in the same map. The workflow can now continue with step 12 (illustrated in FIG. 6 as element 623).
11. If, however, the sPin entered by the user 205 does not match the one in the map, the remote server 303 closes the connection to the user 205. Access is not allowed. In addition the map linking clientIP to a specific user account and Internet smart card is destroyed, step 521'. Subsequent steps listed below become irrelevant.
12. Once access is granted, the user 205 can now interact with the web services provided by the remote server 303 through B2 307, step 623. One aspect of this interaction can be to request that some confidential information (e.g. user's credit card number and expiration date) be retrieved by the remote server 303 from the Internet smart card 207 rather than being typed manually.
13. The remote server 303 forwards this request to the Internet smart card 207, message 625. Because the remote server 303 initiates the request for confidential information, it is a pull model. The remote server 303 is pulling the information from the Internet smart card 207.
14. The Internet smart card 207 does not immediately send back the requested confidential information. Instead, it notifies the user 205 that the remote server 303 is requesting this information, message 627. This notification is sent to the user 205 via web browser B1 305 that is connected to Internet smart card 207.
15. The user responds with either approval or denial, message 629.

16. The Internet smart card 207 then responds to the remote server 303 based on the response received from the user 205, message 631. If the user 205 approves, the confidential information is sent to remote server 303. Otherwise a rejection message is sent.
17. If the confidential information is sent by the smart card 207, the remote server 303 completes the transaction, step 633. If a rejection message is received, the remote server 303 abandons the transaction (not shown). After the transaction is complete, the remote server sends the status and any additional information to the Internet smart card, message 635.
18. The user logs out from the Remote Server, message 637.
19. After receiving the user logout request, the Remote Server deletes the mapping of clientIP, step 639. This prevents subsequent transactions being sent to smart card.
20. The user logs out from his Internet smart card, message 641.

Comparison of the Push and Pull Models

As mentioned above, the push model can be used in most network configurations as long as the Internet smart card 207 has an IP address. This IP address may or may not be globally accessible or unique. In addition there may be firewall that prevents direct outside access to web server running on the Internet smart card 207. Because the Internet smart card 207 can initiate a TCP/IP connection and connect to web servers outside the LAN, the push model can support secure online transactions.

In contrast, the pull model can only be used if Internet smart card 207 is connected to a network in such a way that it is visible and accessible from outside the LAN. In this model an outside entity, e.g. a remote server 303, connects to the web server running on the Internet smart card 207.

Usage Scenario

In a typical usage scenario, the user 205 carries the Internet smart card 207 with him. The card 207 can be connected to the network 209 via any PC 203. The PC 203 may be in a public location and may not be secure, but it can still be used to connect the Internet smart card 207 to the Internet 209 for secure online transactions. This scenario provides the added security of "what you have" paradigm. The Internet smart card 207 can be removed from the network and put back in the user's pocket once a transaction is complete. When in the user's pocket, no malicious code can mount an attack on the Internet smart card 207. Although there are safeguards against such attacks, not having the card 207 on the network precludes even the remote possibility of such attacks.

Prevent Screen Capture Based Identity Theft

Besides keystroke loggers, there are other spy mechanisms that can monitor what people are doing on a computer and send the logs over the Internet. For example, some products capture computer screens; other products capture both screens and keystrokes. The captured information is either transmitted through the Internet or retrieved later for analysis to extract confidential information, for example, passwords.

The method to prevent identity theft according to the invention can also prevent the screen capture based online identity theft. The confidential information is encrypted and is sent between the Internet smart card 207 and the remote secure server 303 directly. The local computer 203 that the user 205 is using does not see such information in clear text and, hence, cannot display it onto screen. Therefore, the screen capturer cannot get the information.

The only two pieces of confidential information manually entered by the user 205 are his PIN to authenticate himself to smart card, and the sPin to authenticate to the remote server 303. Neither of these compromises the current session in any way. Even if captured the PIN and sPIN are not useful without physical access to the Internet smart card 207. Furthermore, both these values can be easily changed once the user returns to a secure PC environment, e.g., in the user's home or office.

Conclusion

The present invention presents a new system and method of using Internet smart cards to prevent online identity theft and to secure online transactions. With this new method, a secure Internet connection is established between the smart card 207 and the remote secure server 303 of the service provider, such as a bank. The personal information, such as passwords, SSN, and credit card numbers, are stored in the smart card 207. The information is encrypted in the smart card 207 and is sent securely from the card to the server 303 directly with the user's authorization. Thus, no confidential personal information goes through the local computer 203 and the Internet 209 in clear (unencrypted) format. This mechanism combats the identity theft mechanism that captures the information on the computer before it is encrypted. This method is not limited to the form of secure Internet smart cards. It applies to other secure tokens that are Internet nodes and have security boundary inside the tokens as well.

What is claimed is:

1. A method for using a secure computing device to secure transactions over a computer network that includes an untrusted client computer with a user interface and a server computer connected to the computer network, in a manner designed to foil identity theft perpetrated from the client computer, comprising:

connecting the secure computing device to the untrusted client computer and the network;

operating the secure computing device to communicate a list of available services, for which the secure computing device stores private information corresponding to the service, to the client computer;

in response to receiving the list of available services, using the user interface to display the list of available services to a user;

in response to a selection of one available service by the user, establishing a secure connection from the secure computing device to the server;

transmitting from the secure computing device to the server computer user identifying information including a shared secret;

establishing a secure connection from the untrusted client computer to the server computer;

operating the server computer to create a one-to-one mapping between the secure computing device and the untrusted client computer;

receiving an attempted entry of the shared secret by the user from the untrusted client computer;

if the entered shared secret matches the shared secret, permitting the user to interact with a service provided by the server computer.

2. The method of claim 1 further comprising:

authenticating a user based on the private information; and in response to successful authentication of the user, conducting a transaction between the client computer and the server computer.

3. The method of claim 1 wherein the connection between the secure computing device and the untrusted client is a direct connection and wherein the secure computing device is connected to the network via the untrusted client.

4. The method of claim 1 wherein the shared secret is a secret personal identification number (sPIN).

5. The method of claim 4 wherein the secure computing device has a personal identification number (PIN) wherein the sPIN and the PIN are unrelated.

6. The method of claim 4 wherein the server computer uses the sPIN for only one session.

7. The method of claim 4 wherein the portable secure computing device is a smart card.

8. The method of claim 1 further wherein the user identifying information includes a unique identifier for the untrusted client computer and wherein the one-to-one mapping is created using the unique identifier.

9. The method of claim 1 further comprising:
operating the server computer to request confidential information from the user;
on the user's request, transmitting from the untrusted client computer to the secure computing device a command to transmit the confidential information from the secure computing device to the server;
in response to the command to transmit the confidential information, transmitting the confidential information from the secure computing device to the server; and
completing a transaction using the confidential information.

10. A method for secure transactions over a computer network that includes an untrusted client computer with a user interface and a server computer, in a manner designed to foil identity theft perpetrated from the client computer, comprising:
connecting a secure computing device to the network;
establishing a secure connection from the secure computing device to the server;
securely communicating a shared secret from the secure computing device to the server over the secure connection;
establishing a secure connection from the untrusted client computer to the server computer;
operating the server computer to create a one-to-one mapping between the secure computing device and the untrusted client computer;
receiving an attempted entry of the shared secret by the user from the untrusted client computer;
authenticating a user by comparing the attempted entry of the shared secret and the shared secret; and
in response to successfully authenticating the user, conducting a transaction between the untrusted client and the server.

11. The method of claim 10 wherein the step of securely communicating private information comprises pushing the private information from the secure computing device to the server computer.

12. The method of claim 11 further comprising:
in response to successfully authenticating a user to the service, operating the client to transmit an indication to the server that the secure computing device will send information necessary for a transaction;
operating the server to wait for the information from the secure computing device;
operating the client to select the information necessary for the transaction; and
in response to selecting the information necessary for the transaction, operating the secure computing device to transmit the selected information securely to the server.

13. The method of claim 10 wherein the step of securely communicating private information comprises operating the server computer to pull the private information from the secure computing device.

14. The method of claim 10 further comprising:
in response to successfully authenticating a user, operating the server to transmit a request to the secure computing device to provide information necessary to complete a transaction;
in response to a request from the server for information necessary to complete a transaction, operating the secure computing device to notify the client that the server has made the request for information necessary to complete a transaction;
in response to notification from the secure computing device that the server is requesting the information necessary to complete a transaction, operating the client to obtain a user's approval or denial of the request; and
in response to a user's approval, transmitting the requested information from the secure computing device to the server in a secure manner.

15. A system for effecting secure transactions over a computer network that includes an untrusted client computer with a user interface and a server computer, in a manner designed to foil identity theft through keystroke logging, comprising:
a secure computing device connected to the computer network and capable of establishing a secure connection with the server computer and the client computer;
wherein the secure computing device has logic operable to store private user information; and
wherein the secure computing device has logic, in response to the initiation of a transaction between a user operating the client computer and the server computer, operable to securely transmit a message containing identifying information linking the secure computing device and the untrusted client computer, and a shared secret to the server computer in a manner such that only the server can interpret the private user information;
a server comprising logic to
receive the message containing identifying information;
in response to receiving the message containing identifying information creating a one-to-one mapping between the secure computing device and the untrusted computer;
receiving an attempted entry of the shared secret by the user from the untrusted client computer;
if the attempted entry of the shared secret matches the shared secret, permitting the user to interact with a service provided by the server computer.

16. The system for effecting secure transactions over a computer network of claim 15:
wherein the message containing identifying information contains the elements clientIP, cardIP, login credentials, and secret personal identification number (sPIN);
wherein the server computer has logic to request the user to enter the sPIN and logic to verify that the entered sPIN matches the sPIN in the map.

17. The system for effecting secure transactions over a computer network of claim 16:
wherein the server computer has logic to destroy the map if the sPIN entered by the user does not match the sPIN of the map.

18. The system for effecting secure transactions over a computer network of claim 15:
   wherein the secure computing device transmits the private user information upon a request by the user.

19. The system for effecting secure transactions over a computer network of claim 15:
   wherein the secure computing device transmits the private user information upon a request by the server computer.

20. The system for effecting secure transactions over a computer network of claim 19:
   wherein the secure computing device transmits the private user information to the server computer only upon permission granted by the user.

21. The system for effecting secure transactions over a computer network of claim 20:
   wherein the server computer destroys the map in response to invalid sPIN, denial of permission from the user, and transaction completion.

* * * * *